US006713741B2

(12) United States Patent
Miller

(10) Patent No.: US 6,713,741 B2
(45) Date of Patent: Mar. 30, 2004

(54) CONVEYORIZED OVEN WITH AUTOMATED DOOR

(75) Inventor: Thomas L. Miller, Wellman, IA (US)

(73) Assignee: Maytag Corporation, Newton, IA (US)

( * ) Notice: Subject to any disclaimer, the term of this patent is extended or adjusted under 35 U.S.C. 154(b) by 157 days.

(21) Appl. No.: 09/844,452

(22) Filed: Apr. 27, 2001

(65) Prior Publication Data
US 2002/0088800 A1 Jul. 11, 2002

Related U.S. Application Data
(60) Provisional application No. 60/200,289, filed on Apr. 28, 2000.

(51) Int. Cl.[7] .................................................. H05B 6/78
(52) U.S. Cl. ........................ 219/700; 219/699; 219/739
(58) Field of Search ................................ 219/700, 699, 219/739, 701, 388, 214; 34/259, 263, 264, 266, 92; 432/152, 128; 426/242, 466, 234; 99/468, 472; 266/92

(56) References Cited

U.S. PATENT DOCUMENTS 2,467,230 A     4/1949   Revercomb et al.
3,889,009 A  *  6/1975   Lipoma ........................ 426/234
4,079,919 A  *  3/1978   Schober et al. ................ 266/92
4,349,714 A  *  9/1982   Tamano ........................ 219/700
4,616,123 A  * 10/1986   Zagoroff ....................... 219/388
4,677,278 A  *  6/1987   Knoll ........................... 219/214
4,687,119 A  *  8/1987   Juillet .......................... 221/101
4,879,444 A    11/1989   Bichot et al.
5,829,163 A    11/1998   Park et al.
5,897,807 A  *  4/1999   Edgar et al. ................. 219/700

* cited by examiner

Primary Examiner—Quang T. Van
(74) Attorney, Agent, or Firm—McKee, Voorhees & Sease, P.L.C.

(57) ABSTRACT

The invention is directed to an oven, and in particular, a microwave oven, having an oven cavity, two doors disposed on opposite sides of the oven cavity, and a conveyor belt passing through the oven cavity and the two doors. The two doors are preferably mechanical in design and may be operated simultaneously or in sequence. The two doors may be independently interlocked and also interlocked with each other to prevent operation of the microwave oven when either door is in an opened position. Each door may be mounted in slide rails disposed along the side of the oven cavity. The opening and closing of the two doors are preferably controlled by a programmable logic center.

5 Claims, 6 Drawing Sheets

CONVEYORIZED OVEN WITH AUTOMATED DOOR

RELATED APPLICATIONS

This application claims the benefit of Provisional Patent Application Ser. No. 60/200,289, filed Apr. 28, 2000, entitled CONVEYORIZED OVEN WITH AUTOMATED DOOR.

BACKGROUND OF THE INVENTION

1. Field of the Invention

The invention is directed to ovens, and in particular, microwave ovens having an oven cavity and two doors and a conveyor belt passing through the oven cavity and the two doors.

2. Description of Related Art

Conveyorized ovens, convection and microwave, have been used in industry for many years to cook or thaw foods and provide heat for processing items such as food, rubber, and foundry cores. The "microwave" ovens generally operate at 915 MHZ or 2,450 MHZ because these frequencies are within narrow frequency bands designated by government agencies for such purpose. Conventionally, such apparatus operate at assigned frequencies of either 915 or 2,450 MHZ and the term "microwave" as used herein is intended to refer to that portion of the electromagnetic energy spectrum having wavelengths in the order of 1 meter to one millimeter and frequencies in excess of 300 MHZ.

In microwave ovens the energy fed to the oven interior, or oven cavity, preferably resonates in a plurality of modes achieved by suitable adjustment of the oven dimensions. Such resonant modes are loaded by absorption of heat by the item being heated, and such absorption varies with the absorbing characteristics of the item as well as its size and shape. To assure uniformity of heating it has generally been desirable to cyclically vary the mode pattern with respect to the article by, for example, a mechanical mode stirrer, by movement of the article within the oven, by varying the frequency of the energy fed to the enclosure, and/or combinations of all of the foregoing techniques. The multiplicity of modes, which vary with the loading within the oven and with the cyclical variation of the modes therein, can result in excitation of modes within the oven cavity. As such, prior conveyorized ovens utilized flaps or energy choke tunnels, also known as suppression tunnels, to decrease the amount of heat and microwaves that escape from the oven cavity during operation of the oven.

In fact, the intensity of microwave energy permitted to leak from domestic and/or industrial microwave heating systems is restricted. In the United States, for example, the Department of Health and Human Services requires that the microwave energy leakage from a domestic oven not exceed one milliwatt per square centimeter in the factory or five milliwatts per square centimeter in the home. In other words, in a plane at a distance of five centimeters from the microwave oven, the intensity of the microwave leakage cannot exceed one milliwatt in the factory, and five milliwatts in the home. Further, the Occupational Safety and Health Administration requires a microwave energy exposure of less than ten milliwatts per square centimeter. The International Microwave Power Institute has adopted a standard for intensity of microwave energy radiation leakage which is "less than ten milliwatts per square centimeter". Furthermore, the Federal Communication Commission has regulations regarding the amount of out-of-band radiation permissible by a microwave oven. Accordingly, systems employing the use of microwave energy for processing of materials or cooking and thawing food must include apparatus to prevent the leakage of microwave energy from the enclosure.

Many industrial ovens, such as convection and microwave ovens, require that there be a continuous access opening into the cavity, so that materials may be transported through the cavity by a conveyor to achieve high throughput. The suppression of microwave energy and heat loss from these continuous access openings has presented problems which are much more complex than a batch-type microwave oven or convection oven that do not include a conveyor belt and that can be manually sealed using a door.

Accordingly, prior to the development of the present invention, there has been no oven or method of heating at least one item in the oven which: provides high throughput, decreases the amount of heat and/or microwave loss from the oven cavity, and operates automatically through the use of a programmable logic center thereby decreasing the number of operators for each oven. Therefore, the art has sought an oven and method of heating at least one item in the oven which: provides high throughput, decreases the amount of heat and/or microwave loss from the oven cavity, and operates automatically through the use of a programmable logic center thereby decreasing the number of operators for each oven.

SUMMARY OF INVENTION

In accordance with the invention the foregoing advantages have been achieved through the present oven for heating at least one food item comprising: an oven cavity having a plurality of oven cavity walls; an oven heat source disposed within the oven cavity; at least one door disposed along at least one of the plurality of oven cavity walls, whereby the at least one door permits access into the oven cavity, the at least one door having a plurality of open positions and a closed position; at least one conveyor belt passing through the at least one door and the oven cavity, whereby at least one food item placed on the at least one conveyor belt can be transported into, and out of, the oven cavity when the at least one door is in at least one of the plurality of open positions; at least one motor operatively associated with the at least one conveyor belt, whereby the at least one motor moves the conveyor belt, and a programmable logic center in communication with the at least one door and the at least one motor, whereby the programmable logic center controls the movement of the at least one door from the closed position to the plurality of open positions to permit the at least one food item to be transported into, or out of the oven cavity, and from the plurality of open positions to the closed position, the programmable logic center preventing the oven from heating the at least one food item when the at least one door is in the plurality of open positions.

A further feature of the oven is that the oven cavity may include two doors. Another feature of the oven is that the two doors may be disposed along different oven cavity walls. An additional feature of the oven is that the two doors may be disposed opposite each other. A further feature of the oven it that the two doors may be interlocked, whereby both doors simultaneously move from the closed position to the plurality of open positions, and from the plurality of open positions to the closed position. Another feature of the oven is that the oven heat source may be a magnetron for providing microwave energy in the oven cavity. An additional feature of the oven is that the oven may include at least one sensor disposed along the at least one conveyor belt, the at least one sensor being in communication with the programmable logic center. A further feature of the oven is that the at least one door may be associated with at least one rail disposed along the at least one oven cavity wall. Another feature of the oven is that the oven may include at least one door actuator in communication with the at least one door and operatively associated with the programmable logic center, whereby the at least one door actuator is controlled by the programmable logic center to move the at least one door from the closed position to one of the plurality of open positions and from one of the plurality of open positions to the closed position. An additional feature of the oven is that the at least one door actuator may be a hydraulic actuator.

In accordance with the invention the foregoing advantages have also been achieved through the present oven for heating at least one food item comprising: an oven cavity having a plurality of oven cavity walls; an oven heat source disposed within the oven cavity; an entrance door disposed along one of the plurality of oven cavity walls, whereby the entrance door permits access into the oven cavity, the entrance door having a plurality of open positions and a closed position; an exit door disposed along one of the plurality of oven cavity walls, whereby the exit door permits access into the oven cavity, the exit door having a plurality of open positions and a closed position a conveyor belt passing through the entrance door, the oven cavity, and the exit door, whereby at least one food item placed on the conveyor belt can be transported into, and out of, the oven cavity when the entrance door is in one of the plurality of open positions, and the at least one food item can be transported out of the oven cavity when the exit door is in one of the plurality of open positions; a motor operatively associated with the conveyor belt, whereby the motor moves the conveyor belt through the entrance door, the oven cavity, and through the exit door; and a programmable logic center operatively associated with the entrance door, the exit door, and the motor, whereby the programmable logic center controls: the movement of the entrance door from the closed position to one of the plurality of open positions to permit the at least one food item to be transported into the oven cavity; the movement of the entrance door from one of the plurality of open positions to the closed position; the oven heat source; the movement of the exit door from the closed position to one of the plurality of open positions to permit the at least one food item to be transported out of the oven cavity, the programmable logic center operable to prevent the oven heat source from heating the at least one food item when either the entrance door or the exit door is in one of the plurality of open positions.

A further feature of the oven is that the entrance door and the exit door may be interlocked, whereby both doors simultaneously move from the closed position to one of the plurality of open positions, and from one of the plurality of open positions to the closed position. Another feature of the oven is that the oven heat source may be a magnetron for providing microwave energy in the oven cavity. An additional feature of the oven is that the oven may include at least one sensor disposed along the conveyor belt, the at least one sensor being operatively associated with the programmable logic center. A further feature of the oven is that the entrance door and the exit door may each be operatively associated with at least one rail disposed along the at least one oven cavity wall. Another feature of the oven is that the at least one door actuator may be operatively associated with both the entrance door and the exit door and operatively associated with the programmable logic center, whereby the at least one door actuator is controlled by the programmable logic center to move the entrance door or the exit door from the closed position to one of the plurality of open positions and from one of the plurality of open positions to the closed position. An additional feature of the oven is that the at least one door actuator may be a hydraulic actuator.

In accordance with the invention, the foregoing advantages have also been achieved through the present method of heating at least one food item in an oven, the oven comprising an oven cavity, a plurality of oven cavity walls, at least one door disposed in at least one of the oven cavity walls, the at least one door having a plurality of open positions and a closed position, an oven heat source, at least one sensor, a programmable logic center, at least one motor, and at least one conveyor belt passing through the at least one door and the oven cavity, comprising the steps of: placing the at least one food item on the conveyor belt; sensing the at least one food item on the conveyor belt by the at least one sensor, sending a first signal from the at least one sensor to the programmable logic center; sending a second signal from the programmable logic center to the at least one door to confirm that the at least one door is in any of the plurality of open positions or to open the at least one door, if the at least one door is in the closed position; sending a third signal from the programmable logic center to activate the at least one motor, whereby the conveyor belt begins to move; moving the at least one conveyor belt through the at least one door, whereby the conveyor belt transports the at least one food item through the at least one door and into the oven cavity; sending a fourth signal from the programmable logic center to the at least one motor, whereby the at least one motor is stopped and the conveyor belt is stopped whereby the at least one food item is located within the oven cavity; sending a fifth signal from the programmable logic center to the at least one door, whereby the at least one door is moved from one of the plurality of open positions to the closed position; sending a sixth signal from the at least one door to the programmable, logic center to confirm that the at least one door is in the closed position; sending a seventh signal from the programmable logic center to the oven heat source, whereby the oven heat source is activated and the oven cavity is heated; heating the at least one food item for an amount of time sufficient to heat the at least one food item; sending an eighth signal from the programmable logic center to the oven heat source, whereby the oven heat source is deactivated; sending a ninth signal from the programmable logic center to the at least one door, whereby the at least one door is moved from the closed position to one of the plurality of open positions; sending a tenth signal from the programmable logic center to the at least one motor, whereby the conveyor belt begins to move; and moving the conveyor belt through the at least one door, whereby the conveyor belt transports the at least one food item through the at least one door and out of the oven cavity.

A further feature of the method of heating at least one item is that the at least one door may include at least one door actuator, the at least one door being moved from the closed position to one of the plurality of open positions, and from one of the plurality of open positions to the closed position, by sending an actuating signal from the programmable logic center to the at least one door actuator. Another feature of the method of heating at least one item is that the oven cavity may include two doors. An additional feature of the method of heating at least one item is that the two doors may be disposed along different cavity oven walls. A further feature of the method of heating at least one item is that the two doors may be disposed opposite each other.

In accordance with the invention, the foregoing advantages have also been achieved through the present method of heating at least one food item in an oven, the oven comprising an oven cavity, a plurality of oven cavity walls, at least one door disposed in at least one of the oven cavity walls, the at least one door having a plurality of open positions and a closed position, a continuously heating oven heat source, a first and a second sensor, a programmable logic center, at least one motor, and at least one continuously moving conveyor belt passing through the at least one door and the oven cavity, comprising the steps of: placing the at least one food item on the continuously moving conveyor belt; sensing the at least one food item on the continuously moving conveyor belt by the first sensor; sending a first signal from the first sensor to the programmable logic center; sending a second signal from the programmable logic center to the at least one door to confirm that the at least one door is in any of the plurality of open positions or to open the at least one door, if the at least one door is in the closed position; moving the at least one continuously moving conveyor belt through the at least one door, whereby the continuously moving conveyor belt transports the at least one food item through the at least one door and into the oven cavity; sending a third signal from the programmable logic center to the at least one door, whereby the at least one door is moved from one of the plurality of open positions to the closed position; sending a fourth signal from the at least one door to the programmable logic center to confirm that the at least one door is in the closed position; heating the at least one food item for an amount of time sufficient to heat the at least one food item; sending a fifth signal from the second sensor to the programmable logic center; sending a sixth signal from the programmable logic center to the at least one door, whereby the at least one door is moved from the closed position to one of the plurality of open positions; and moving the continuously moving conveyor belt through the at least one door, whereby the continuously moving conveyor belt transports the at least one food item through the at least one door and out of the oven cavity.

The oven and method of heating at least one item in the oven of the present invention have the advantages of: providing high throughput, decreasing the amount of heat and/or microwave loss from the oven cavity, and operating automatically through the use of a programmable logic center, thereby decreasing the number of operators for each oven.

BRIEF DESCRIPTION OF DRAWINGS

In the accompanying drawings, wherein like numerals denote identical elements.

Figure 1:
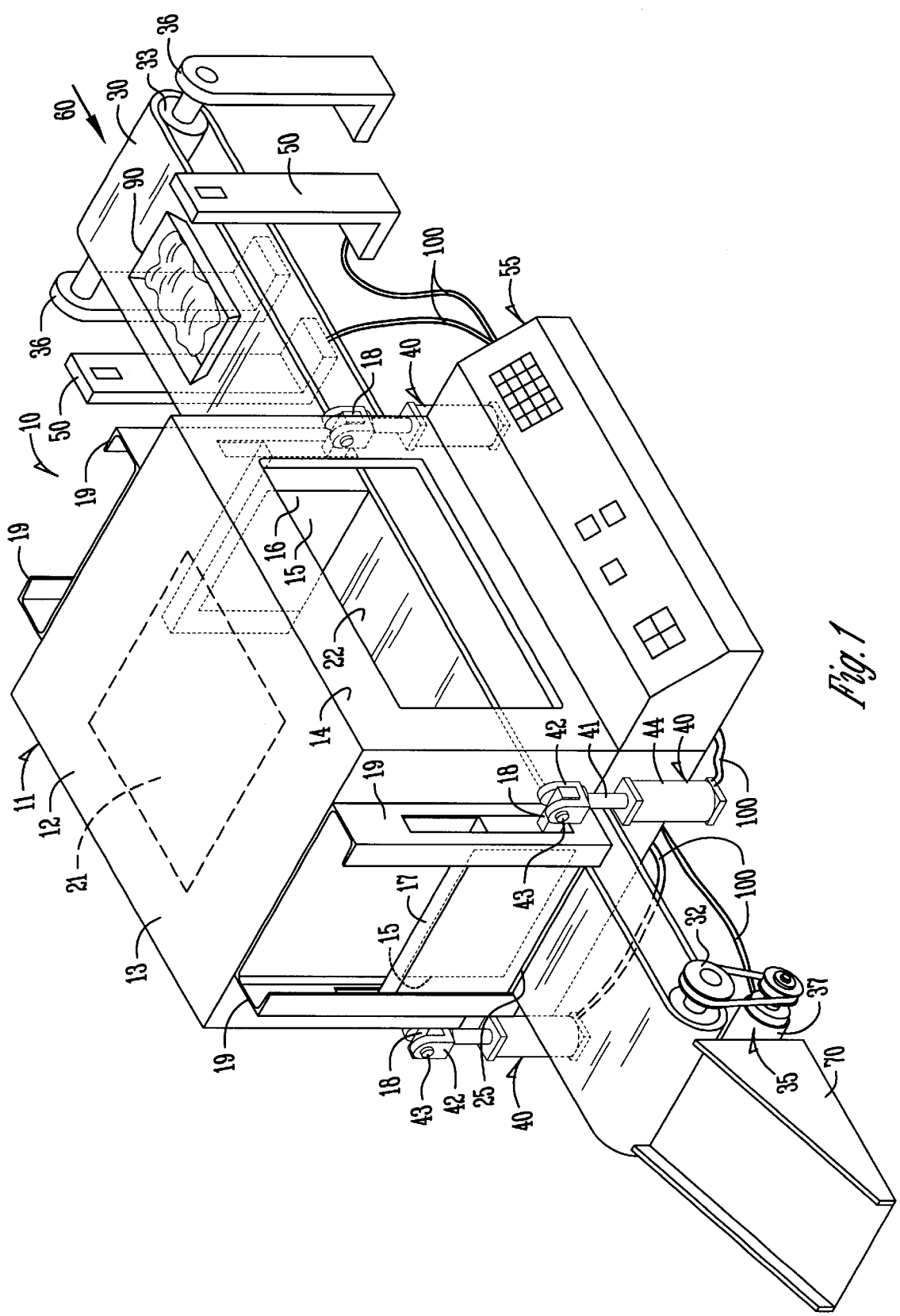
FIG. 1 is a perspective view of one specific embodiment of an oven for heating at least one food item.

While the invention will be described in connection with the preferred embodiment, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION AND SPECIFIC EMBODIMENTS

The invention is directed to ovens, and in particular, microwave ovens having a conveyor belt for passing items through the microwave oven. "Items" is herein defined as any object, industrial or otherwise, that is desired by the operator of the oven to be heated. Example items include, but are not limited to, food items, rubber items, and foundry cores. While the following description of several specific embodiments are directed to microwave ovens, it is to be understood that the present invention is also directed to conventional ovens, e.g., convection ovens.

Referring now to FIGS. 1–5, in one specific embodiment of the present invention an oven 10 is comprised of an oven cavity 11 having a plurality of oven cavity walls 12. The oven cavity 11 is preferably conductive of heat and may be any shape desired or necessary to provide uniform heating. As shown in FIGS. 1–5, the oven cavity 11 has six oven cavity walls 12, including a top oven cavity wall 13 and a bottom oven cavity wall 14. An oven heat source 21 is disposed within the oven cavity 11. The oven heat source 21 may be any device for providing heat into the oven cavity 11. Example oven heat sources 21 include electric coils, high energy light sources, microwave sources, e.g.,magnetron, and/or gas burners. Additionally, one or more of the oven cavity walls 12 may include a window 22 for viewing items within the oven cavity 11.

As shown in FIG. 1 oven 10 includes two doors 15 and a conveyor belt 30. While the specific embodiment shown in FIGS. 1–5 includes two doors 15 and one conveyor belt 30, it is understood that alternative embodiments may include only one door 15 and a plurality of conveyor belts 30 (FIG. 8), or two doors 15 and a plurality of conveyor belts.

Figure 3:
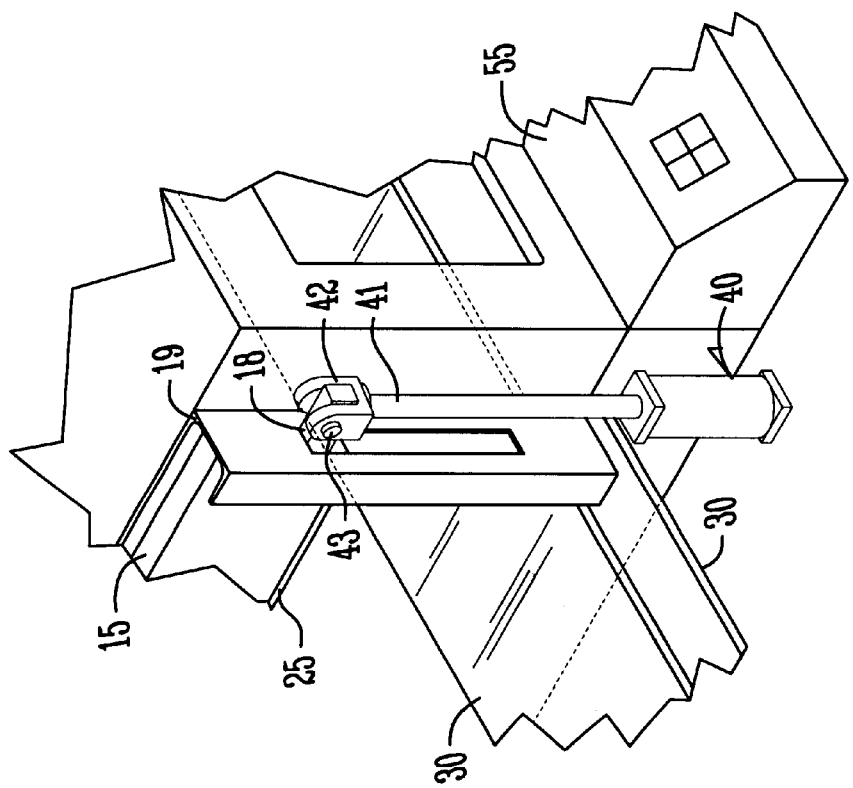
FIG. 3 is a partial perspective view of a door of the oven shown in FIG. 1 in one of the plurality of the open positions.
Figure 2:
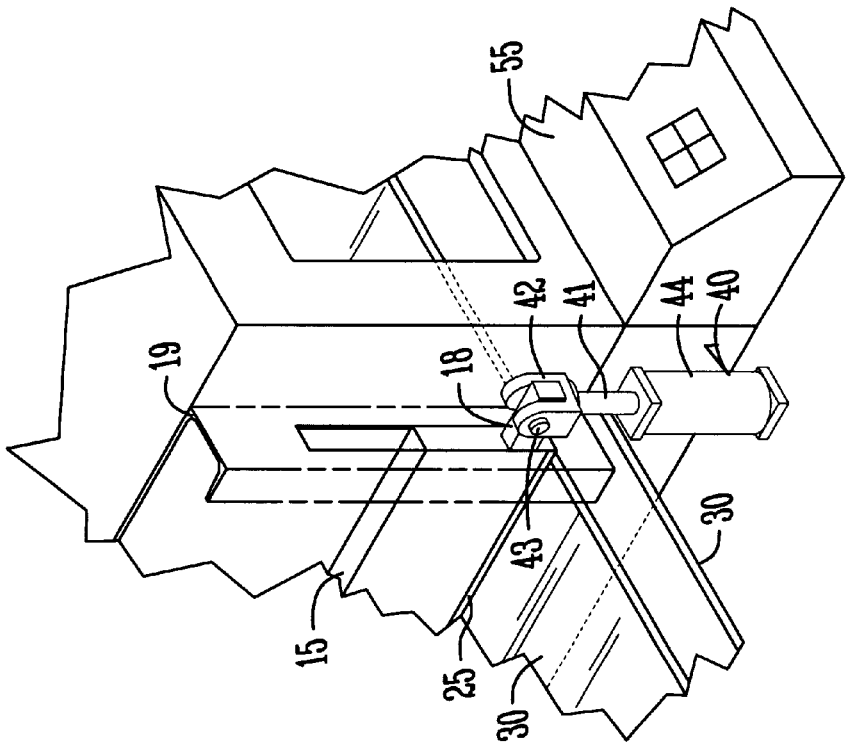
FIG. 2 is a partial perspective view of a door of the oven shown in FIG. 1 in the closed position.
Figure 4:
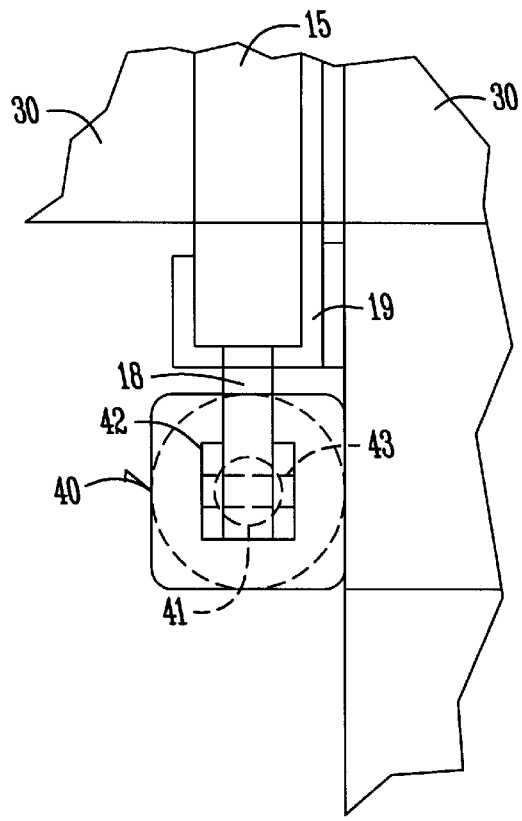
FIG. 4 is a partial top view of a door actuator operatively associated with a door of the oven shown in FIG. 1.
Figure 5:
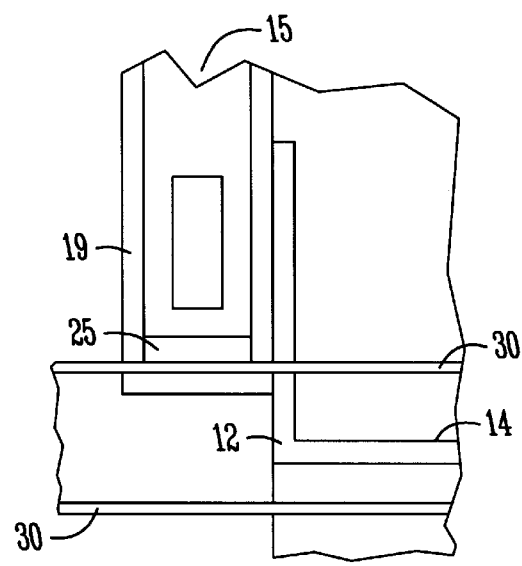
FIG. 5 is a partial side view of a door of the oven shown in FIG. 1 in the closed position.

Each door preferably includes at least one door flange 18. Door 15 is associated with at least one rail 19 disposed along at least one oven cavity wall 12. As shown in FIGS. 1–5, each door 15 preferably is associated with two rails 19. Door 15 provides access into the oven cavity 11. Door 15 includes a closed position (FIGS. 1, 2 and 5) and a plurality of open positions (FIG. 3 showing one of the plurality of open positions). Door 15 may be moved from the closed position to any of the plurality of open positions that is desired or necessary to allow an item 90 to be transported on the conveyor belt 30 into, and out of, oven cavity 11. In a preferred embodiment, the two doors 15 are independently interlocked and also interlocked with each other to prevent operation of oven 10 when either door 15 is in any one of the plurality of open positions. While in one of the preferred embodiments, each door 15 shown in FIGS. 1–5 operates independently, i.e., doors 15 operate sequentially so that only one door 15 is moved to any one of the plurality of open positions at a time, it is understood that the two doors 15 may be operated simultaneously, i.e., moved to and from the closed position to any one of the plurality of open positions as the same time.

Door 15 may also include a heat and/or microwave absorption material 25 along the bottom of door 15 to facilitate sealing door 15 to conveyor belt 30. It is contemplated that heat and/or microwave absorption material 25 assists to lessen the escape of heat and/or microwaves from oven cavity 11 at the connection between door 15 and conveyor belt 30 (FIG. 5) when door 15 is in the closed position.

Door 15 is moved to and from the closed position and the plurality of open positions in any manner known by persons skilled in the art. In a preferred embodiment, door 15 is moved to and from the closed position and the plurality of open positions by at least one door actuator 40. Door actuator 40 may be electric, hydraulic, pneumatic, or any other actuator capable of providing the desired movement of door 15. Door actuator 40 includes an actuator body 44, an actuator shaft 41 and an actuator attachment flange 42. The actuator shaft 41 is operatively associated with the actuator body 44. The actuator attachment flange 42 is connected to the actuator shaft 41.

Door 15 is operatively associated with the actuator attachment flange 42. As shown in FIGS. 1–4, door flange 18 of door 15 is operatively associated with actuator attachment flange 42. Fastener 43, such as a pin, bolt, or screw, facilitates door flange 18 being operatively associated with actuator attachment flange 42.

Conveyor belt 30 is operatively associated with at least one motor 35. Motor 35 is operatively associated with motorbelt 37 which is operatively associated with a first conveyor roller 32. First conveyor roller 32 is operatively associated with conveyor belt 30, thereby facilitating movement of conveyor belt 30 when motor 35 is engaged, i.e., running. Alternatively, motor 35 may be operatively associated with a plurality of rollers, or with any other mechanism, whereby motor 35, or other belt movement providing device, can cause the desired movement of conveyor belt 30.

As shown in FIG. 1, a second conveyor roller 33 is operatively engaged with conveyor belt 30 to facilitate movement of conveyor belt 30. Second conveyor roller 33 is associated with supports 36. Supports 36 may be stands (as shown in FIG. 1), or any other apparatus or device that supports second conveyor roller 33 to facilitate movement of conveyor belt 30.

In a preferred embodiment, oven 10 includes at least one sensor 50 located along conveyor 30 for sensing the presence, or absence, of item 90 on conveyor belt 30. Sensor 50 may be any sensing device known by persons skilled in the art. For example, sensor 50 may be a light sensor, or photoelectric eye, similar to sensors used on garage doors. Another example of an acceptable sensor 50, is one that detects the presence or absence of item 90 by weight. Preferably, sensor 50 is a light sensor.

In another preferred embodiment, motor 35, oven heat source 21, door 15, and/or door actuator 40, and sensor 50 are in communication with programmable logic center 55. Programmable logic center 55 may be a microprocessor, computer or any other device known to persons skilled in the art that permits oven 10 to heat item 90 automatically, i.e., by permitting oven 10 to carry out the necessary steps of heating item 90, without the need for many operators of oven 10. As shown in FIG. 1, programmable logic center 55 is in communication with motor 35, door actuator 40 and sensor 50 by conventional wire connections 100. Programmable logic center 55 may also be in communication with door 15 and oven heat source 21 by conventional wire connections (not shown). Alternatively, one or more of motor 35, door 15, door actuator 40 and sensor 50 may be in communication with programmable logic center 55 by radio transmission or in any other manner known to persons skilled in the art.

Item 90 is placed on conveyor belt 30 for transportation along conveyor belt 30 through doors 15 and oven cavity 11. As shown in FIG. 1, item 90 is transported in the direction indicated by arrow 60. Therefore, as shown in FIG. 1, oven 10 includes an entrance door 16 and an exit door 17. Also shown in FIG. 1, oven 10 may also include ramp 70 for easily removing item 90 from conveyor belt 30 after item 90 has passed through oven cavity 11.

Figure 6:
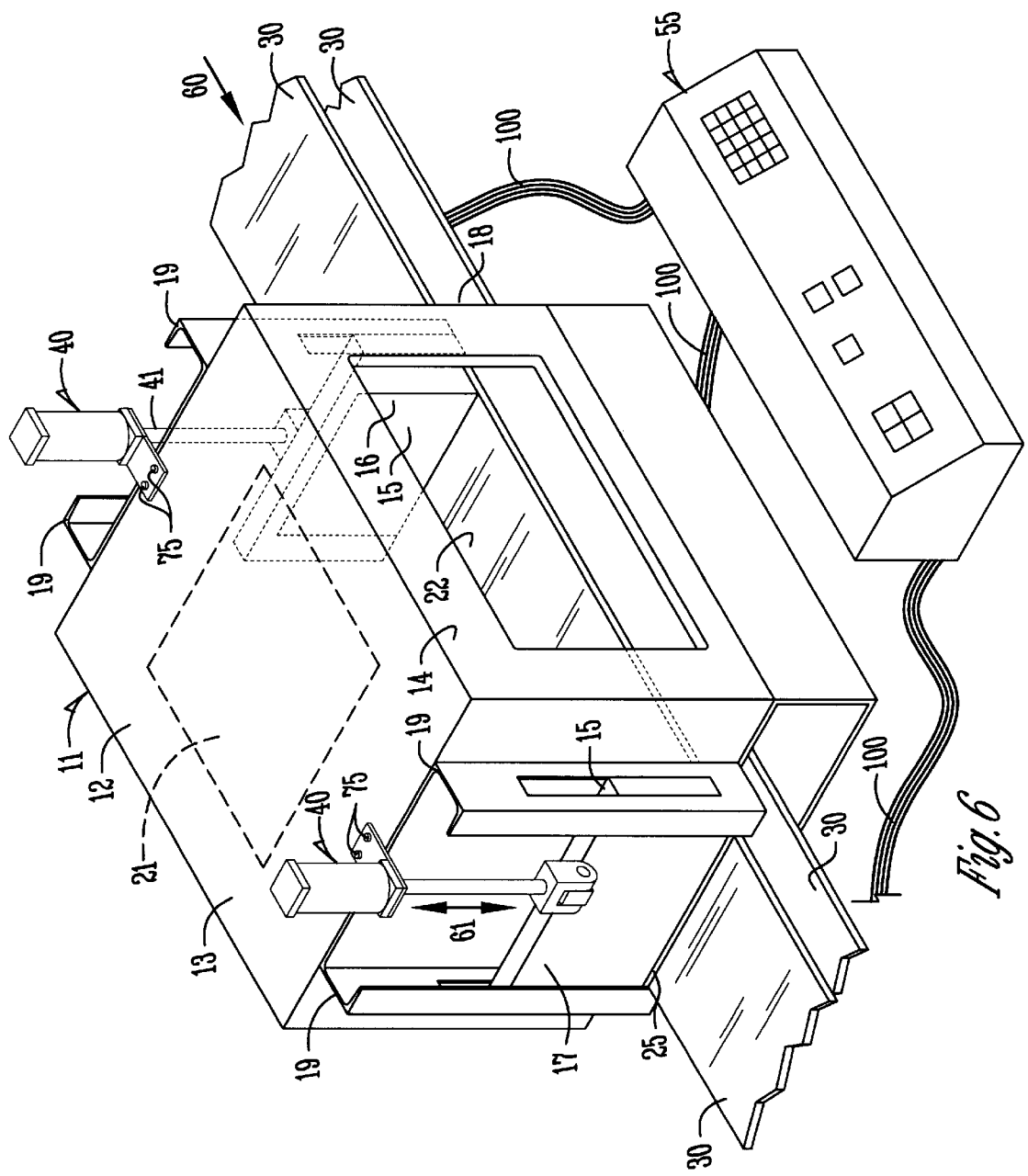
FIG. 6 is a partial perspective view of the oven cavity of another embodiment of an oven of the present invention.
Figure 7:
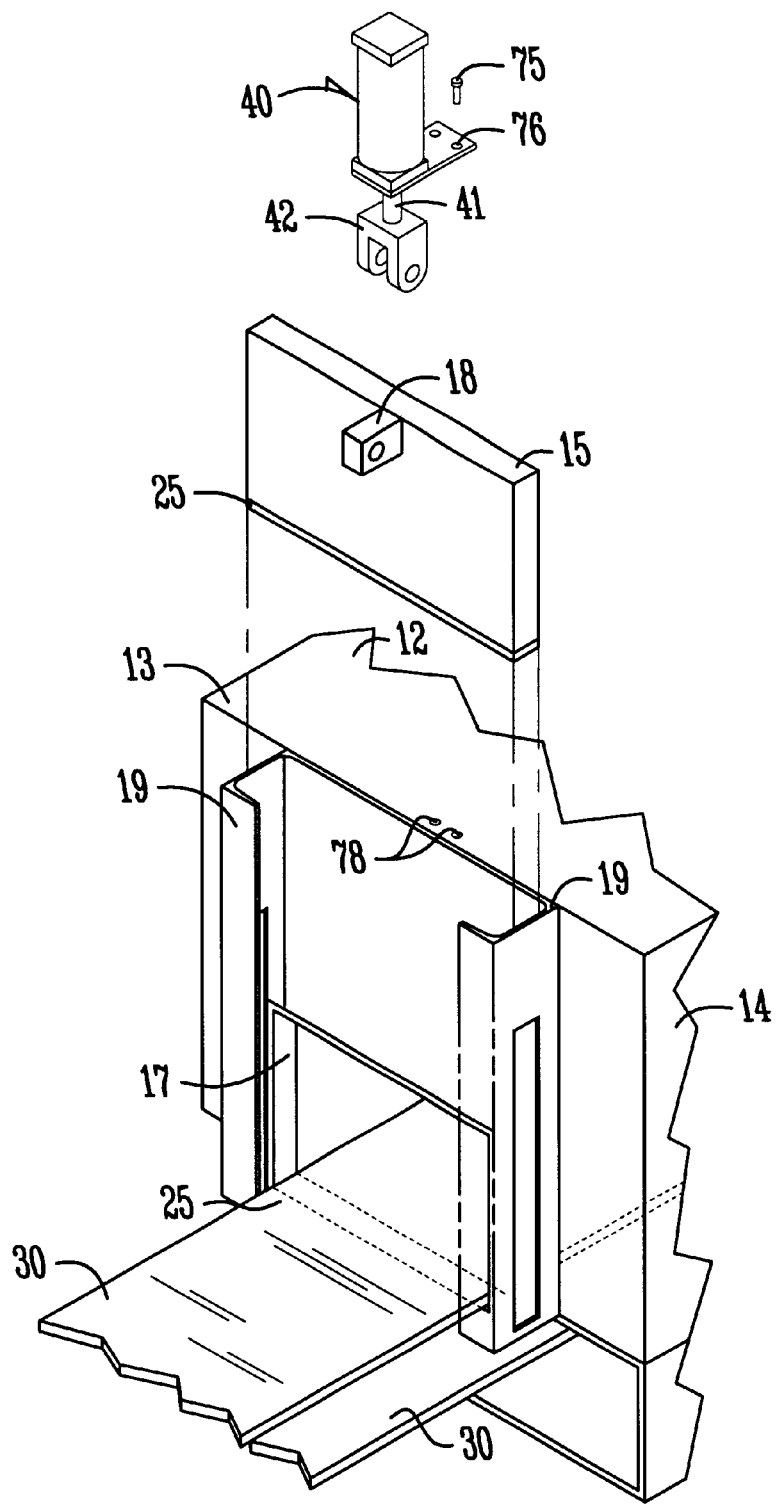
FIG. 7 is an exploded partial view of a door of the oven shown in FIG. 6.

Referring now to FIGS. 6–7, another specific embodiment of the oven 10 of the present invention is shown. As shown in FIGS. 6–7, the oven 10 includes two door actuators 40 disposed on the top oven cavity wall 12, 13 of oven cavity 11. The door actuators 40 are connected to the top oven cavity wall 12, 13 by placing at least one fastener 75, e.g., bolts or screws, through corresponding fastener holes 76, 78. In this embodiment, door actuators 40 are connected to each door in the same manner as discussed above, however, door flange 18 is disposed at the top of each door 15. Doors 15 are then moved to and from their closed and plurality of open positions (arrow 61) in the same manner as discussed above.

Figure 8:
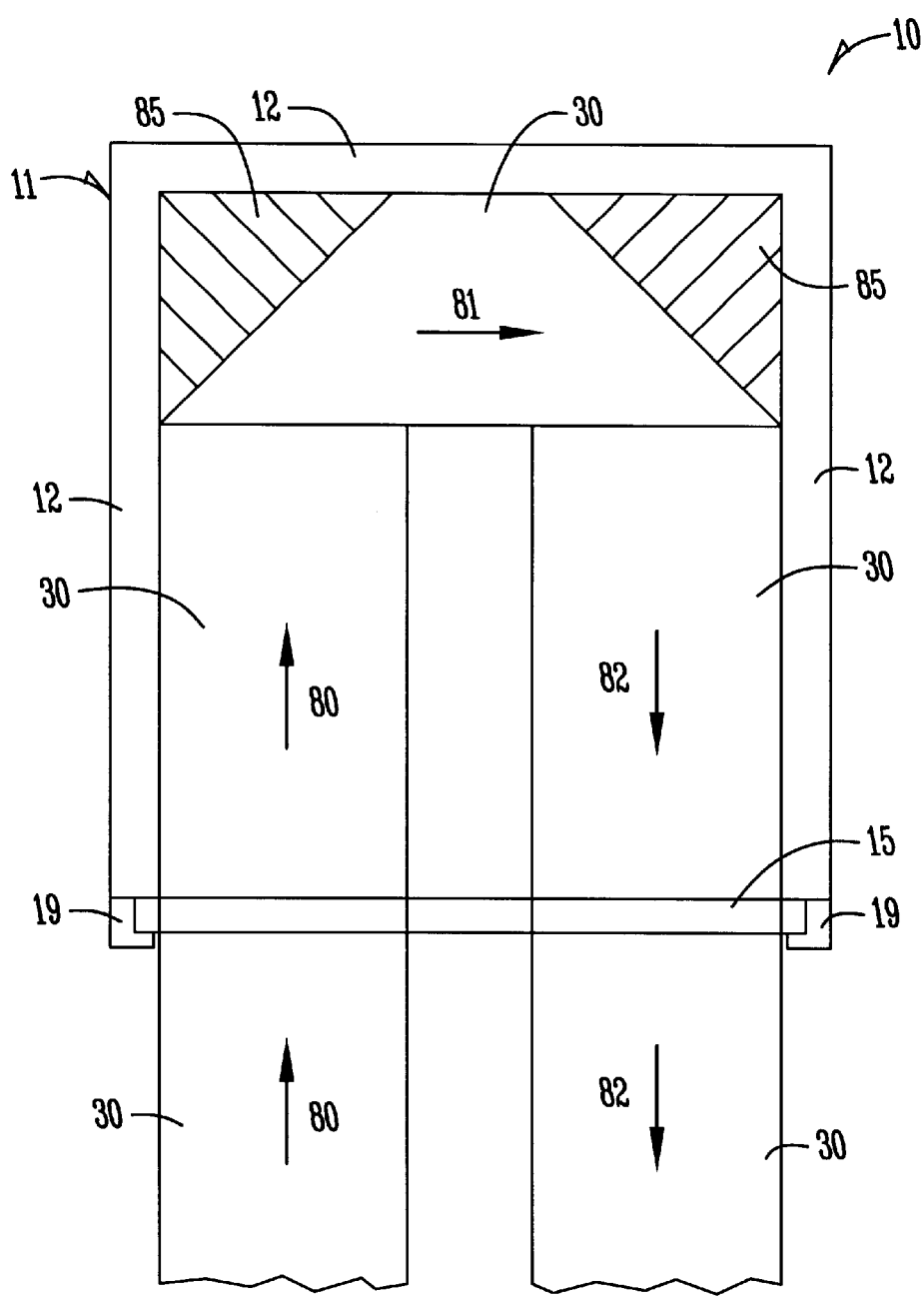
FIG. 8 is a top view of the inside of the oven cavity of a further embodiment of an oven of the present invention.

Referring now to FIG. 8, which shows an alternate embodiment of the present invention, oven 10 includes three conveyor belts 30, 30' and 30" and door 15. Item 90 is transported into oven cavity 11 in the direction indicated by arrow 80. After item 90 enters oven cavity 11, door 15 is moved from the plurality of open positions to the closed position as discussed in more detail above. Item 90 is continued to be transported in the direction indicated by arrow 80 until it contacts direction changing wall 85. Direction changing walls 85 are located in oven cavity 11 to facilitate item 90 being transferred from conveyor belt 30 to conveyor belt 30' and from conveyor belt 30' to conveyor belt 30". After item 90 contacts direction changing wall 85, item 90 is transferred from conveyor belt 30 to conveyor belt 30'. Item 90 is transported on conveyor belt 30' in the direction indicated by arrow 81. Item 90 is then transferred from conveyor belt 30' to conveyor belt 30" by direction changing wall 85. Item 90 is then transported in the direction indicated by arrow 82. After item 90 passes a preset location along conveyor belt 30", door 15 is moved from the closed position to any one of the plurality of open positions as described in greater detail above. Item 90 is then transported on conveyor belt 30" through door 15 and out of oven cavity 11. While item 90 is being transported through oven cavity 11, oven heat source (not shown) heats item 90. Additionally, while FIG. 8 shows one door 15, it is to be understood that two doors 15 may be employed.

Oven 10, disclosed and described above, may be employed to heat item 90. In one specific embodiment, item 90 may be heated by oven 10 by placing item 90 on conveyor belt 30. Item 90 is sensed by sensor 50. Sensor 50 then sends a first signal to programmable logic center 55 to indicate to the programmable logic center that an item 90 is located on the conveyor belt 30 and ready to be heated.

A second signal is sent from programmable logic center 55 to door 15 to confirm that door 15 is in any of the plurality of open positions, or to open door 15, e.g., by activating door actuator 40 (actuating signal), if door 15 is in the closed position. In a preferred embodiment, sensor 50 identifies the height of item 90, or distance from conveyor belt 30 to the top of item 90, and communicates the height of item 90 to the programmable logic center 55 in the first signal, or as a separate signal. Therefore, the second signal from the programmable logic center 55 to door 15, or door actuator 40 (actuating signal) may communicate to door 15, or door actuator 40, the necessary opening of door 15 to permit item 90 to be transported into oven cavity 11.

A third signal is sent from programmable logic center 55 to motor 35 to activate motor 35, whereby conveyor belt 30 begins to move. Conveyor belt 30 transports item 90 through door 15 and into oven cavity 11.

A fourth signal is sent from programmable logic center 55 to motor 35 to stop motor 35, and thus, conveyor belt 30, whereby item 90 is located within oven cavity 11.

A fifth signal is sent from programmable logic center 55 to door 15, or door actuator 40 (actuating signal), whereby door 15, or door actuator 40, is activated and door 15 is moved from any one of the plurality of open positions to the closed position.

A sixth signal is sent from programmable logic center 55 to door 15, or door actuator 40, to confirm that door 15, or door actuator 40, is in the closed position.

A seventh signal is sent from programmable logic center 55 to the oven heat source 21, whereby the oven heat source is activated, i.e. turned-on, and the oven cavity 11 is heated.

After a preset period of time that is programmed into programmable logic center 55 by the operator of oven 10, an eighth signal is sent from programmable logic center 55 to the oven heat source 21, whereby the oven heat source 21 is deactivated, i.e., turned-off.

A ninth signal is sent from programmable logic center 55 to door 15, or door actuator 40 (actuating signal), whereby door 15, or door actuator 40, is activated and door 15 is moved from the closed position to any one of the plurality of open positions.

A tenth signal is sent from the programmable logic center 55 to motor 35 to activate motor 35, and thus, begin to move conveyor belt 30. Conveyor belt 30 transports item 90 through door 15 and out of oven cavity 11.

In another embodiment, conveyor belt 30 may be continuously moving (continuously moving conveyor belt 30) and oven heat source may be continuously activated, i.e., heating the oven cavity 11 (continuously heating oven heat source). In this embodiment, after item 90 is placed on conveyor belt 30, sensor 50 sends a signal to programmable logic center 55 indicating the presence of item 90 on conveyor belt 30. As discussed above, a signal is then sent from programmable logic center 55 to door 15, or entrance door 16, to confirm that door 15 is the desired or necessary open position, or to open door 15 if door 15 is in the closed position. Conveyor belt 30 transports item 90 into and through the oven cavity 11. While passing through oven cavity 11, door 15 is closed as discussed above. As item 90 passes through oven cavity 11, a second sensor (not shown) located at a predetermined location within oven cavity 11 may be activated and send a signal to programmable logic center 55. Programmable logic center 55 may then send a signal to door 15, or exit door 17, or door actuator 40 (actuating signal), to activate door 15 to move door 15 from the closed position to the desired or necessary open position. Item 90 is transported on conveyor belt 30 out of oven cavity 11 and down ramp 70. As is easily recognizable to those skill in the art, the speed of the continuously moving conveyor belt 30 will determine the amount of time item 90 is heated in oven cavity 11.

All signals may be sent by radio transmission, through wire connections 100, or in any other manner known to persons skilled in the art. Similarly, signals may be combined, provided oven 10 operates in the manner desired by the operator of oven 10. As is easily recognized by persons skilled in the art, the method of heating an item in the oven 10 described above may be employed in ovens having two doors 15 disposed along different oven cavity walls 12, e.g., the two doors 15 are disposed opposite each other, or two doors 15 disposed along the same oven cavity wall 12 (FIG. 8).

It is to be understood that the invention is not limited to the exact details of construction, operation, exact materials, or embodiments shown and described, as obvious modifications and equivalents will be apparent to one skilled in the art. Accordingly, the invention is therefore to be limited only by the scope of the appended claims.

What is claimed is:

1. An oven for heating a food item comprising;
    an oven cavity having a plurality of oven cavity walls;
    an oven heat source disposed within the oven cavity;
    an entrance door disposed along one of the oven cavity walls to permit access into the oven cavity, the entrance door being movable between an open position and a closed position;
    an exit door disposed along one of the oven cavity walls opposite the entrance door, to permit access into the oven cavity, the exit door being movable between an open position and a closed position;
    a conveyor belt passing through the entrance door, the oven cavity, and the exit door, whereby a food item placed on the conveyor belt can be transported into the oven cavity when the entrance door is in the open position, and the food item can be transported out of the oven cavity when the exit door is in the open position;
    a motor operatively associated with the conveyor belt, whereby the motor moves the conveyor belt through the entrance door, the oven cavity, and through the exit door;
    a programmable logic center operatively associated with the entrance door, the exit door, and the motor, whereby the programmable logic center controls: the movement of the entrance door between the open and closed positions ; the oven heat source; the movement of the exit door between the open and closed positions ; the programmable logic center being operable to prevent the oven heat source from heating the food item when either the entrance door or the exit door is in the open position;
    the entrance door and the exit door each have opposite side edges and each being operatively associated with a pair of rails disposed along the opposite door edge and mounted to the oven cavity wall to which each door is disposed; and
    the entrance door and the exit door being interlocked, whereby both doors simultaneously move along the rails between the open and the closed position.

2. The oven of claim 1, wherein the oven heat source is a magnetron for providing microwave energy in the oven cavity.

3. The oven of claim 1, including at least one sensor disposed along the conveyor belt, the sensor being operatively associated with the programmable logic center.

4. The oven of claim 1, including at least one door actuator operatively associated with both the entrance door and the exit door and operatively associated with the programmable logic center, whereby the door actuator is controlled by the programmable logic center to move the entrance door from the closed position to the open position and from the open position to the closed position.

5. The oven of claim 4, wherein the door actuator is a hydraulic actuator.

* * * * *